United States Patent
Grinde

[15] 3,674,161
[45] July 4, 1972

[54] LIFT BOOM ASSEMBLY
[72] Inventor: Jon W. Grinde, Moorhead, Minn.
[73] Assignee: King Company, Inc., Fargo, N. Dak.
[22] Filed: April 6, 1970
[21] Appl. No.: 25,649

[52] U.S. Cl. .........................................214/130 R, 214/766
[51] Int. Cl. ..........................................................B66c 23/00
[58] Field of Search ..................214/130 R, 766, 138, 131

[56] References Cited

UNITED STATES PATENTS

| | | |
|---|---|---|
| 2,868,399 | 1/1959 | Fortier .............................. 214/131 X |
| 3,018,010 | 1/1962 | Przybylski ............................. 214/138 |
| 2,313,514 | 3/1943 | Brooks ............................ 214/77 R X |
| 2,738,889 | 3/1956 | Fritsch .............................. 214/138 R |
| 3,260,386 | 7/1966 | Engstrom ............................... 214/766 |
| 3,471,033 | 10/1969 | Drury .................................214/130 X |
| 2,543,496 | 2/1951 | Holopainen ...........................214/766 |
| 3,396,862 | 8/1968 | Fischer .................................214/620 |

FOREIGN PATENTS OR APPLICATIONS

| | | |
|---|---|---|
| 624,460 | 6/1949 | Great Britain ........................214/130 |
| 1,413,482 | 11/1964 | France ..................................214/766 |

*Primary Examiner*—Robert G. Sheridan
*Assistant Examiner*—Jerold M. Forsberg
*Attorney*—Burd, Braddock & Bartz

[57] ABSTRACT

A lift boom assembly mounted on the draft links of a three-point hitch on a tractor. A power control cylinder, connected to the tractor and on an upper portion of the base of the boom, pivots the boom on the draft links of the hitch to raise and lower the boom. The boom has a first rearwardly directed member holding a second removable member.

7 Claims, 8 Drawing Figures

INVENTOR.
JON W. GRINDE
BY Burd, Braddock & Bartz
ATTORNEYS

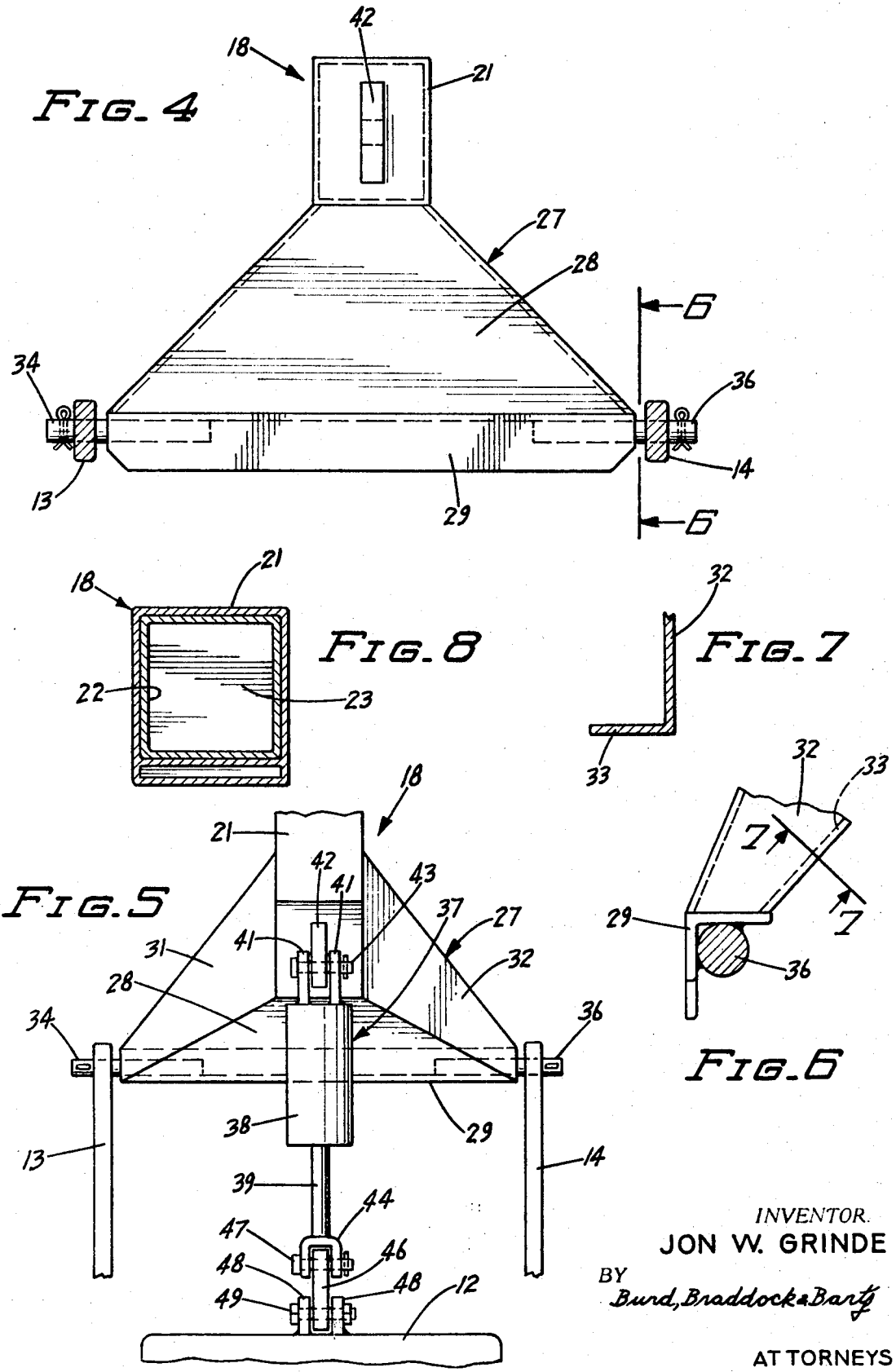

LIFT BOOM ASSEMBLY

SUMMARY OF INVENTION

The invention relates to a lift boom having a base that is pivotally supported on a pair of members, as the draft links of a three-point hitch. An expandable and contractible power means, as an hydraulic cylinder, is connected to the support and the upper portion of the base of the boom to pivot the boom on the members. A second expandable and contractible power means can be used to raise and lower the members to change the elevation of the boom independent of the power means. The boom has a plurality of cooperating members usable to change the effective length of the boom.

IN THE DRAWINGS

FIG. 4 is an enlarged sectional view taken along the line 4—4 of FIG. 1;

FIG. 5 is a top plan view of the rear portion of the lift boom assembly of FIG. 1;

FIG. 6 is an enlarged sectional view taken along the line 6—6 of FIG. 4;

FIG. 7 is an enlarged sectional view taken along the line 7—7 of FIG. 6; and

FIG. 8 is an enlarged sectional view taken along the line 8—8 of FIG. 1.

Figure 1:
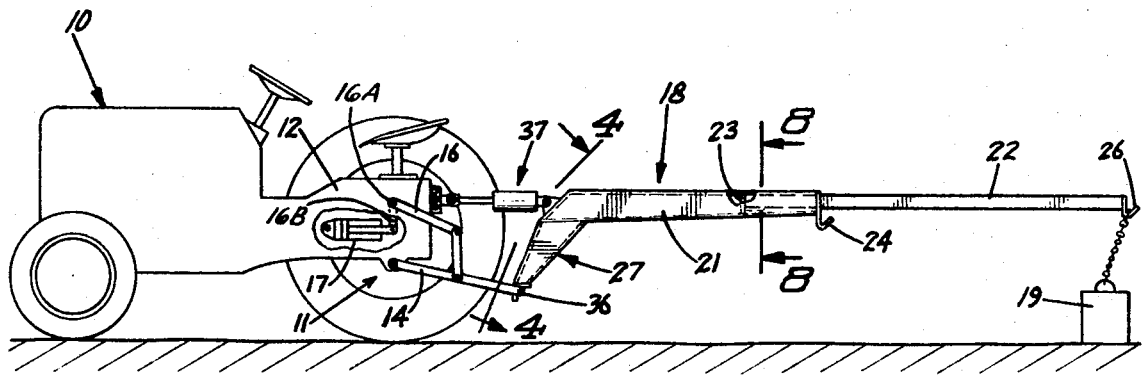
FIG. 1 is a diagrammatic view of a tractor having a three-point hitch equipped with the lift boom assembly of the invention.
Figure 2:
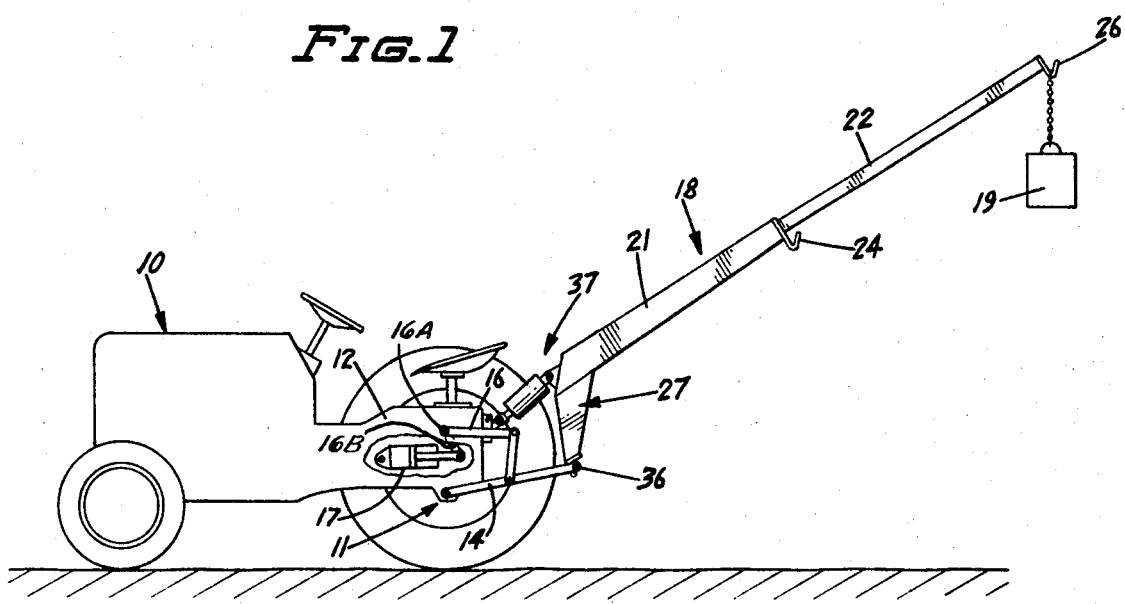
FIG. 2 is a view similar to FIG. 1 showing the lift boom in the elevated position.
Figure 3:
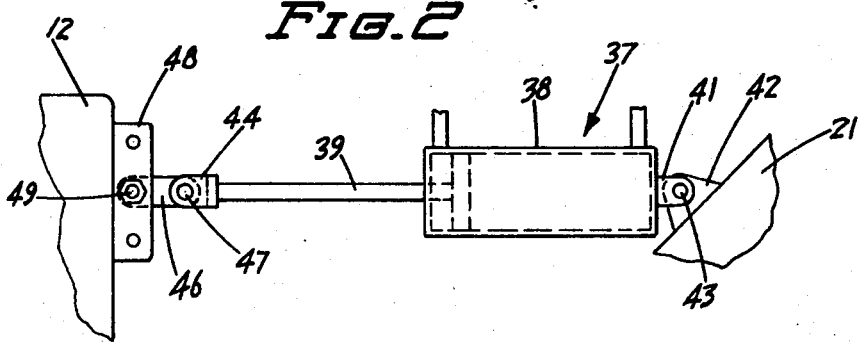
FIG. 3 is an enlarged side view of the power control cylinder connected to the tractor and the base of the lift boom.

Referring to the drawings, there is shown in FIGS. 1 and 2 a tractor, indicated generally at 10, equipped with a three-point hitch structure 11. The tractor 10 may be an industrial or agricultural tractor having an internal combustion engine and an hydraulic system for operating the three-point hitch. Other types of tractors or motor vehicles having lift systems can be used with the lift boom assembly of the invention.

Tractor 10 has a transmission housing 12 for supporting the three-point hitch 11. Extended rearwardly from the lower portion of the housing 12 are a pair of draft links or members 13 and 14. A pair of lift arms 16, connected to the draft links, are controlled by an hydraulic cylinder 17 to raise and lower the draft links. The arms 16 are fixed to a transverse shaft 16A rotatably mounted on the tractor transmission housing. A crank arm 16B, secured to the transverse shaft 16A, is connected to the piston rod of the cylinder 17. The hydraulic cylinder 17 is connected to the hydraulic system of the tractor and controlled by suitable valves (not shown) so that the operator can control up and down movement of the draft links. This conventional three point hitch structure is shown in U.S. Pat. No. 2,543,496.

The lift boom assembly of the invention, indicated generally at 18, is pivotally mounted on the three-point hitch 11. In use, the lift boom assembly 18 moves from a lowered, generally horizontal position, as shown in FIG. 1, to an elevated, raised position shown in FIG. 2 to handle the load 19.

The lift boom assembly 18 has a first elongated boom member 21 carrying a second boom member 22. The second boom member 22 telescopes into the outer end of the first boom member 21 and engages a stop plate 23. The second member 22 can be removed to shorten the effective length of the boom. Suitable hooks 24 and 26 are attached to the outer end of the boom members 21 and 22 to accommodate the structures for releasably attaching the load 19 to the boom. As shown in FIG. 8, the boom members 21 and 22 have generally rectangular cross sections. The boom member 23 telescopes with a close, sliding fit into the boom member 21.

As shown in FIGS. 4 and 5, a downwardly and forwardly extended base, indicated generally at 27, is attached to the end of the first boom member 21. The base is pivotally mounted on the draft links 13 and 14 for movement about a generally horizontal transverse axis. Base 27 has a generally trapezoidal front plate 28 secured at its lower edge to a transverse angle iron 29. Obtuse angle side plates 31 and 32 are joined to the sides of the triangular plate 28 and the lower portion of the boom member 21. The rear edges of the side plates 31 and 32 have inwardly directed flanges 33, as shown in FIGS. 6 and 7, to reinforce the plates. As shown in FIG. 4, pivot rods 34 and 36 are secured to the opposite ends of the angle iron 29. The rods 34 and 36 project outwardly from the opposite ends of the angle member 29 and are pivotally mounted on the rear ends of the draft links 13 and 14.

The boom assembly 18 is rotated about the transverse axis of the pivot rods 34 and 36 by the action of an expandable and contractible power means, indicated generally at 37. The power means is an hydraulic cylinder or a fluid motor having a cylinder 38 and a piston rod 39 connected to a piston. The cylinder 38 can be a double acting cylinder, whereby fluid under pressure operates to both expand and contract the hydraulic cylinder. The cylinder is connected with suitable lines to the hydraulic system, including the control valve of the tractor, so that the operator can conveniently control the cylinder. The base of the cylinder 38 has a pair of rearwardly directed ears 41 located on opposite sides of a rib 42 secured to the end or upper portion of the base 27. A pivot pin 43 pivotally connects the ears 41 to the rib 42.

The forward end of the piston rod 39 has a clevis 44 receiving a link 46. A pivot pin 47 pivotally connects the clevis 44 with the link 46. The link 46 extends between attaching plates 48 extended rearwardly from the tractor housing 12. A pin 49 couples the link 46 to the plates 48.

In use, the boom assembly 18 is attached to the three-point hitch 11 of the tractor 10 by mounting the pivot rods 34 and 36 on the ends of the draft links 13 and 14. The control power means 37 for the boom assembly is connected to the tractor through the link 46. The pin 49 pivotally attaches the link 46 to the attaching plates 48 secured to the back of the housing 12. The control power means 37, being an extensible and contractible power member, as an hydraulic cylinder, is operable to pivot the boom about the point rods 34 and 36 thereby selectively raising and lowering the outer end of the boom assembly. The power means 17 of the three-point hitch is also used to selectively raise and lower the draft links 13 and 14 to further change the position of the boom assembly. As shown in FIG. 1, the draft links 13 and 14 are in their lowered positions, and the control power means 37 is in its extended position. The boom assembly 18 is in a generally horizontal position. The boom assembly 18 is moved to the raised position by contracting the control power means 37 to pivot the boom assembly 18 in an upward direction as shown in FIG. 2. The maximum elevation is achieved by raising the draft links 13 and 14 and thereby raising the entire boom assembly. The action of the power means 17 of the three-point hitch provides relatively small amounts of movement in the boom assembly 18 as compared to the expansion and contraction of the control power means 37. In other words, the control power means 37 is operable to provide the major up and down movements for the boom assembly 18.

The above description and drawing is directed to a preferred embodiment of the lift boom of the invention. Changes, modifications in the size and shape of the parts shown can be made by those skilled in the art without departing from the invention. For example, the hydraulic control power means may be a single acting hydraulic cylinder, a double acting hydraulic cylinder, or a power driven transmission having an extending and contracting member. The boom assembly 18 can be made up of a plurality of interconnected boom members. A third boom member can be slidably attached to the second boom member 22 to further extend the length of the boom. Alternatively, the entire boom may be a single member having a base pivotally mounted on the draft links of a three-point hitch.

The embodiments of the invention in which an exclusive property or privilege is claimed are defined as follows:

1. A boom assembly for use with a tractor having a pair of laterally spaced draft members, first hydraulic cylinder means operable to selectively raise and lower the draft members comprising: an elongated linear boom means adapted to be connected to a load, base means at one end of the boom means, said base means having downwardly directed side members and a front plate, said side members and front plate diverging in outwardly directions, the upper portions of said side members and front plate being fixedly secured to said end of the boom means, the lower section of the base means being substantially wider than the width of the boom means and having transverse end portions located closely adjacent the draft members, transverse pivot means on opposite sides of the lower section of the base means mounting the base means on the draft members for pivotal movement of the base means on the draft members about a transverse axis, second hydraulic cylinder means connected to said one end of the boom means above the transverse pivot means in substantial linear alignment with the boom means, means for pivotally connecting the second cylinder to the tractor so that operation of the second cylinder pivots the base means on the draft members about the axis of the transverse pivot means, whereby the boom means can be selectively raised and lowered by the separate or concurrent operation of the first cylinder means and the second cylinder means.

2. The structure of claim 1 wherein: the base has a bottom member located transversely between the draft members, said transverse pivot means being secured to opposite portions of the bottom member and pivotally mounted on the draft members.

3. The structure of claim 2 wherein: the side members are side plates extended in a downwardly and forwardly direction.

4. The structure of claim 1 wherein: the means pivotally connecting the second cylinder means to the tractor comprises a link and separate pins connecting the link to the tractor and second cylinder means.

5. The structure of claim 1 wherein: the boom means comprise a plurality of boom members having cooperating telescoping portions to releasably mount adjacent boom members to each other.

6. The structure of claim 1 including: a transverse angle member secured to the lower portions of said side members and front plate, said pivot means being secured to opposite portions of said angle member.

7. The structure of claim 6 wherein: the pivot means are rods projected outwardly from opposite ends of the angle member and pivotally mounted on the draft members.

* * * * *